United States Patent [19]

Ohishi et al.

[11] Patent Number: 5,002,388
[45] Date of Patent: Mar. 26, 1991

[54] OPTICAL DISTANCE MEASURING APPARATUS HAVING A MEASUREMENT ERROR COMPENSATING FUNCTION

[75] Inventors: Masahiro Ohishi, Tokyo; Fumio Ohtomo, Asaka, both of Japan

[73] Assignee: Tokyo Kogaku Kikai Kabushiki Kaisha, Japan

[21] Appl. No.: 323,305

[22] Filed: Mar. 15, 1989

[30] Foreign Application Priority Data

Mar. 16, 1988 [JP] Japan .................................. 63-62822

[51] Int. Cl.$^5$ .............................................. G01C 3/08
[52] U.S. Cl. .......................................... 356/5; 354/403
[58] Field of Search ............................ 356/5; 354/403

[56] References Cited

U.S. PATENT DOCUMENTS

| | | | |
|---|---|---|---|
| 3,619,058 | 11/1971 | Hewlett | 356/5 |
| 3,740,141 | 6/1973 | DeWitt | 356/5 |
| 3,778,159 | 12/1973 | Hines et al. | 356/5 |
| 4,560,271 | 12/1985 | Fumio | |

Primary Examiner—Stephen C. Buczinski
Attorney, Agent, or Firm—Mason, Fenwick & Lawrence

[57] ABSTRACT

An optical distance measuring apparatus having measurement error compensating function for compensating the measurement error due to electromagnetic induction noise which would lower the accuracy in distance measurement. According to the optical distance measuring apparatus of the present invention, the distance from the apparatus to the target is given by the difference in optical path between an "external optical path" to a corner-cube prism, i.e. the external target, and an "internal reference optical path". The measurement error can be cancelled by the periodicity of the measurement error curve and the predetermined length of the optical path extension means. Thus the measurement error can be compensated for and therefore a measured distance value free of measurement error can be obtained from the distance measuring apparatus.

3 Claims, 2 Drawing Sheets

OPTICAL DISTANCE MEASURING APPARATUS HAVING A MEASUREMENT ERROR COMPENSATING FUNCTION

BACKGROUND OF THE INVENTION

The present invention relates to an optical distance measuring apparatus capable of compensating for measurement error due to electromagnetic induction noise which would lower the accuracy in distance measurement by the optical distance measuring apparatus.

It is known that an optical distance measuring apparatus generally has an error which periodically increases and decreases in accordance with the distance to be measured. Such an error is generally called "measurement error" since it influences the distance measurement. Heretofore, measurement error has been compensated by an electric means.

However, it is difficult to completely eliminate measurement error due to electromagnetic induction noise since the conventinal method for error compensation uses an electric means. Also, the conventional method cannot eliminate the drift in electromagnetic induction noise due to, for example, temperature change when such drift arises after completion of adjustment of the apparatus. In addition, much time is required for the conventional method to carry out highly accurate compensation for the measurement error.

SUMMARY OF THE INVENTION

Accordingly, it is an object of the present invention to provide an optical distance measuring apparatus having a measurement error compensating function which can eliminate the above-mentioned problems inherent in the prior art and can also easily obtain measurement of high-accuracy distance measurement.

For achieving the object of the present invention, there is provided according to the present invention an optical distance measuring apparatus having a measurement error compensating function comprising: a light emission means for emitting amplitide modulated light toward a target the distance to which is to be measured; a light receiving means for receiving the amplitude modulated light reflected by said target; an internal reference optical path for directly leading said amplitude modulated light from said light emission means to said light receiving means; an external distance measuring optical path for directing said amplitude modulated light from said emission means toward said target and for leading the amplitude modulated light reflected therefrom to said receiving means; an optical path switching means for selecting one or the other of said internal reference optical path and said external distance measuring optical path and for switching so that said amplitude modulated light from said light emission means can pass along the selected optical path; an optical path extension means connected to part of said internal reference optical path and external distance measuring optical path for extending their lengths by a predetermined length; a phase detecting means for detecting the phase of an output signal from said light receiving means; and a distance measuring means for calculating the distance to said target by using the detected phase from said phase detecting means when said amplitude modulated light passes through both said extended and unextended internal and external optical paths.

(The principle of the invention)

Periodicity of measurement error

In FIG. 1 the distance X from the optical distance measuring apparatus to a corner-cube prism (this prism corresponds to an external target) is represented on the x-axis and the measurement error $\Delta L(X)$ of the measured distance value relative to the real distance value is represented on the y-axis as will be noted, the measurement error appears as a periodically repeated sinusoidal curve.

Our experiments that confirmed the wavelength of the measurement error curve is the same as the 20 meter wavelength of the 15 MH$_2$ amplitude modulated light used in precision distance.

The wavelength of 15 MHz amplitude modulated light is 20 meters. If the corner-cube prism is set 10 meters from the optical distance measuring apparatus (i.e. if the distance to be measured is 10 meters), the round-trip distance of 20 meters between the apparatus and the corner-cube prism coincides with the wavelength of 20 meters of the amplitude modulated light.

That is, the distance to be measured (½ the round-trip distance between the optical distance measuring apparatus and the corner-cube prism) corresponds to ½ the wavelength of the amplitude modulated light which causes the error in the distance for measurement.

The [above-mentioned] measurement error curve is a sinusoidal curve having a period 10 meters. From the nature of sinusoidal functions, the measurement error $\Delta L(g)$ at a distance "g" meters equals a measurement error $\Delta L\,(g+10)$ at a distance $(g+10)$ meters, that is, $$\Delta L(g) = \Delta L(g+10) \tag{1}$$

The absolute value of the measurement error $\Delta L\,(g+5)$ at a distance $(g+5)$ meters equals the measurement error $\Delta L\,(g)$ but has a negative sign$(-)$, that is, $$\Delta L(g+5) = -\Delta L(g) \tag{2}$$

Compensation for measurement error

According to the optical distance measuring apparatus of the present invention, the distance from the apparatus to the target is obtained from the difference between the length of the "external optical path" to the corner-cube prism (i.e. the external target) and the length of an "internal reference optical path".

Accordingly, the inventors found that the measurement error curve giving the change in measurement error relative to the measured distance can be represented by a sinusoidal curve having a wavelength equal to the wavelength of the modulating frequency of the amplitude modulated light used in the optical distance measuring apparatus for precision measurement. Then by setting the length of the optical path of the optical path extension means to, for example, ½ the wavelength of the amplitude modulated light, obtaining the phase difference signals output by the phase detector and representing the differences in the internal and external optical paths between the case in which the optical path extension means is connected and the case in which it is unconnected, and then obtaining the arithmetical means of the phrase difference, it is possible to cancel out the measurement error by the periodicity of the measurement error curve and the predetermined length of the optical path extension means. Thus the measurement error can be compensated for and therefore a measured value measuremnt error can be obtained from the distance measuring means.

BRIEF DESCRIPTION OF THE DRAWINGS

Other objects and advantages of the present invention will become apparent from the following detailed description of preferred embodiment of the present invention taken in reference to the accompanying drawings in which.

DESCRIPTION OF THE PREFERRED EMBODIMENT

Figure 2:
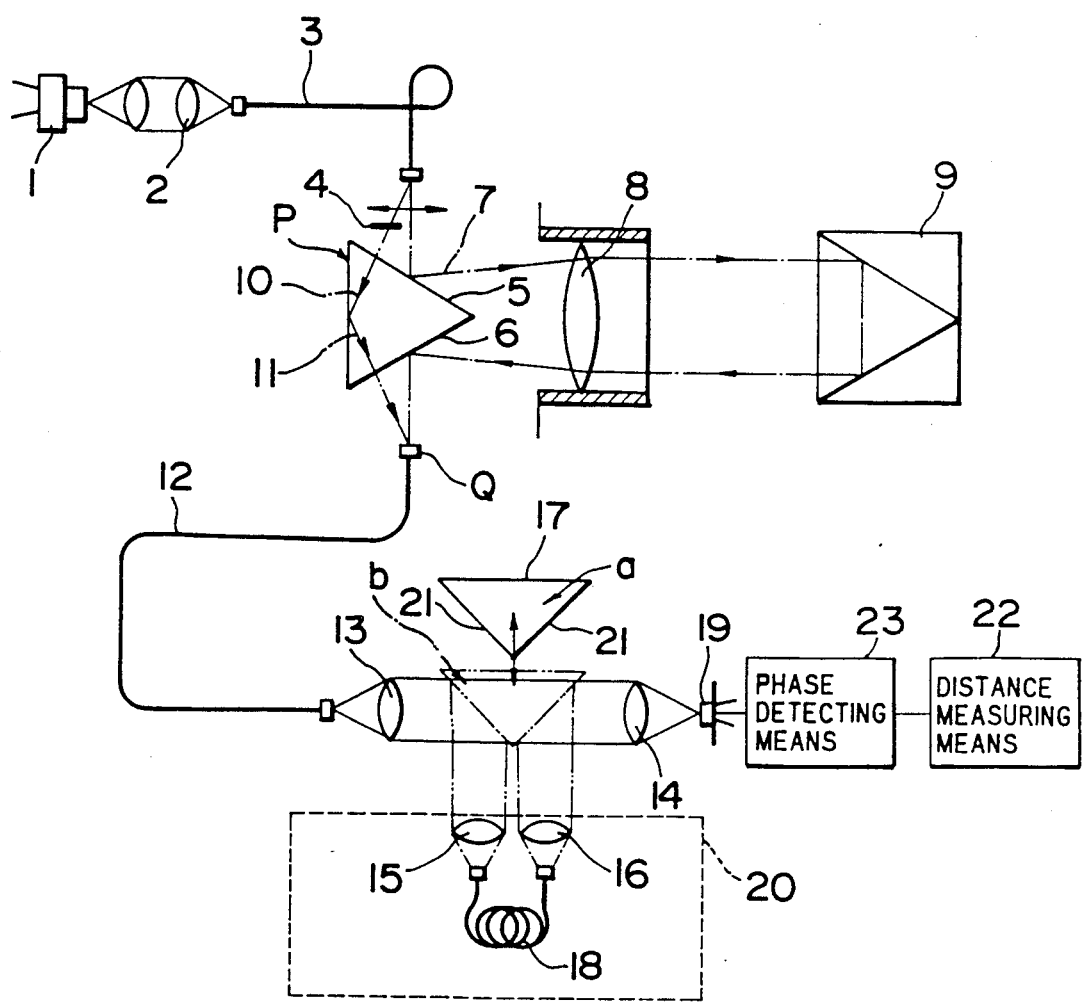
FIG. 2 is a block diagram showing the structure of an optical distance measuring apparatus of the present invention.

With reference to FIG. 2, a light emission means 1 emits two kinds of light waves, a light wave for accurate measurement having a modulation frequency of 15 MHz (wavelenght of 20 meters) and a light wave for rough measurement having a frequency of 75 KHz (wavelength of 2 km). An 15 MHz amplitude modulated light is used in the preferred embodiment of the present invention.

The amplitude modulated light emitted from the light emission means 1 is converged by a condenser lens 2 to one end of an optical fiber 3 and then arrives at the other end of the optical fiber 3. A prism P is arranged opposite to said other end of the optical fiber 3 and a shutter 4 is positioned therebetween. The shutter 4 constitutes a first optical path switching means for selectively switching between an external distance measuring light or an internal reference light.

When the shutter 4 is in the position shown in FIG. 2, the amplitude modulated light reflected by the reflecting surface 5 of the prism P travels along an optical path 7 for external distance measurement. Then the light passes through an objective lens 8 and enters a corner-cube prism 9 which constitutes as an external target. The objective lens 8 makes the incident light parallel. The light incident on the corner-cube prism 9 is reflected by it and then again passes through the objective lens 8 and is reflected by a reflecting surface 6 of the prism P and arrives at a point Q.

On the other hand, when the shutter 4 is not in the position of FIG. 2, the amplitude modulated light entering the prism P is r eflected by an internal reflecting surface 10 thereof and travels along an internal reference optical path 11 and then arrives at the point Q.

The light arriving at the point Q then enters an optical fiber 12 and arrives at the distal end of the optical fiber 12. The light emitted from the distal end of the optical fiber 12 enters a lens 13 and is converted to a parallel luminous flux and then enters a lens 14 and finally enters into a light receiving means 19. Under such circumstances, an optical path switching prism 17, which constitutes second optical path switching means for switching between a standard optical path or an extended optical path, is in the position "a" shown by a solid line in FIG. 2 and does not interrupt the luminous flux between the lenses 13 and 14.

When the optical path switching prism 17 is in a position "b" shown by a phantom line, the parallel luminous flux from the lens 13 is reflected by a reflecting surface 21 and then is converged by a lens 15 to form an image on its focal point on which one end of an optical fiber 18 such as a "Gi" (Graded-index) type fiber is disposed. A lens 16 is disposed on the other end of the "Gi" type optical fiber 18. These lenses 15 and 16 and optical fiber 18 constitute an optical path extension means 20. In this preferred embodiment, the length of the optical path of the optical path extention means 20 is determined to be equal to ½ the 20 m wavelength of the 15 MHz amplitude modulated light for precision measurement. Specifically, the length of the optical path is determined to be 10 m, and the measured distance to be 5 m.

As stated above, when the optical path switching prism 17 is switched to the position "b", the parallel luminous flux from the lens 13 is reflected by the reflecting surfaces 21 of the prism 17 and the n enters the lens 15. Then the light converged by the lens 15 travels through the optical fiber 18 and the lens 16 and then enters the lens 14 after having been reflected by a reflecting surface 21 of the prism 17.

The luminous flux emitted from the lens 14 is converged on the light receiving means 19 (disposed at the focal point of the lens 14). In such a way, the light travels along a longer optical path while passing through the optical path extension means 20 when the prism 17 is in the position "b". On the other hand, the light travels along a shorter optical path without passing through the optical path extension means 20 when the prism 17 is in the position "a".

It will be appreciated that any combination of extended and unextended internal reference optical paths and external distance measuring optical path can be freely selected by appropriately switching the shutter 4 constituting the first optical path switching means and-/or the optical path switching prism 17 constituting the second optical path switching means.

The amplitude modulated light entering the light receiving means 19 is converted to an electric signal and this signal is then transmitted to a phase detecting means 23. Finally, a distance measuring means 22 connected to the phase detecting means 23 calculated the distance to the corner-cube prism (i.e. the external target) 9 based upon the phase difference detected by the phase detecting means 23 and corresponding to the difference in length between the selected optical paths.

The operation of the optical distance measuring apparatus of the present invention will now be described. As shown in the following table, four kinds of separate optical paths L can be obtained by appropriately positioning the shutter 4 and the switching prism 17. These four optical paths L also represent respective lengths of the optical path.

| kind/length of optical path | position of prism 17 | optical path selected by shutter 4 |
|---|---|---|
| $L_{ext.}$ | a | ext. optical path 7 |
| $L_{int.}$ | a | int. ref. optical path 11 |
| $L_{(ext.+5)}$ | b | ext. optical path 7 |
| $L_{(int.+5)}$ | b | int. ref. optical path 11 |

In the above table, "ext." and "int." indicate whether the optical path selected by the shutter 4 is an "external optical path" or an "internal reference optical path". Also, "+5" represent that the switching prism 17 is in the position "b".

According to optical distance measuring apparatus of the present invention, the measured distance from the apparatus to the corner-cube prism (i.e. the external target) 9 can generally be obtained by subtracting the measured distance value of the "internal reference optical path" from the measured distance value of the "external optical path".

Figure 1:
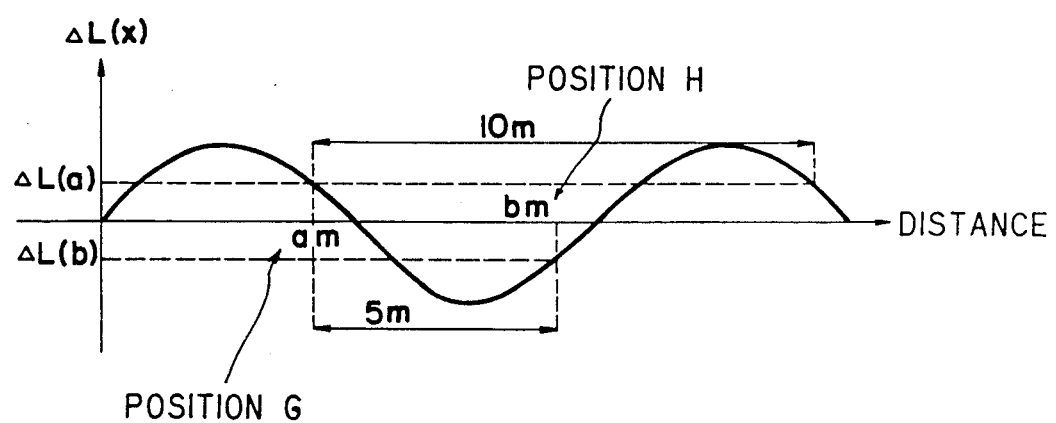
FIG. 1 is a diagram showing, as a periodical function of the measured distance, a measurement error due to electromagnetic induction noise, which is one factor lowering the measurement accuracy of the optical distance measuring apparatus.

Firstly, in case of measuring a target point G (FIG. 1) which is positioned "a" meters away from the optical distance measuring apparatus, the measured value L is defined as follows:

$$L = L_{ext.} - L_{int.} \quad (3)$$
$$= a + \Delta L(a)$$

Then a value of $[L_{est.+5} - L_{int.}]$ is measured. In this case, the value of thereof corresponds to a distance longer than the real distance by 5 meters (which corresponds to the increment of optical path in the optical path extension means 20.) That is, the value corresponds to that of a position H situated 5 meters away from the point G. Since the distance measuring error $\Delta L(b)$ (for a distance "b" meters from the reference point to the position H is for the position H) situated 5 meters ($\frac{1}{2}$ wavelength) away from the position G, the magnitude thereof is equal to $\Delta L(a)$ and the sign thereof is inverse. Accordingly the value L' of $[L_{ext.+5} - L_{int.}]$ measured by the optical distance measuring apparatus is obtained as follows:

$$L' = L_{ext.+5} - L_{int.} \quad (4)$$
$$= b + \Delta L(b)$$

Also $$b = a + 5 \quad (5)$$

$$\Delta L(b) = \Delta L(a+5) = -\Delta L(a) \quad (6)$$

Considering the conditions of the equations (5) and (6), the value of $[L+(L'-5)]/2$ can be obtained as follows:

$$\frac{L + (L' - 5)}{2} = \frac{[a + \Delta L(a)] + [b + \Delta L(b)] - 5}{2} = a \quad (7)$$

The thus obtained value "a" meters represents the correct measured distance, the error due to electromagnetic induction noise being completely cancelled.

The cancellation of the error due to electromagnetic induction noise can also be carried out as following. The following matters can be understood by comparing $L_{ext.}$, $L_{int.}$, $L_{ext.+5}$ and $L_{int.+5}$ with each other.

When comparing $L_{ext.}$ with $L_{ext.+5}$, it will be appreciated that the length of $L_{ext.+5}$ is longer than $L_{ext.}$ by 5 meters and accordingly $L_{ext.+5}$ includes electromagnetic induction noise which has a same magnitude as the electromagnetic induction noise included in $L_{ext.}$ and also has a sign inverse thereto.

The same relation can be found between $L_{int.}$ and $L_{int.+5}$. Accordingly, considering these relations and the equation (7), the cancellation of the electromagnetic induction noise from $L_{ext.}$, $L_{int.}$, $L_{ext.+5}$ and $L_{int.+5}$ can be carried out as following.

In order to eliminate the electromagnetic induction noise from the external distance measuring optical path, it suffice if:

$$\frac{L_{ext.} + (L_{ext.+5} - 5)}{2} \quad (8)$$

and similarly if the internal reference optical path is:

$$\frac{L_{int.} + (L_{int.+5} - 5)}{2} \quad (9)$$

Thus, equations 8 and 9 demonstrate how the distance measuring means 22 averages both the half-wavelength phase-delayed optical lengths and the non-phase-delayed optical lengths.

Thus, the real distance can be obtained as (8)-(9), that is,:

$$(8) - (9) = \frac{L_{ext.} + (L_{ext.+5} - 5)}{2} - \frac{L_{int.} + (L_{int.+5} - 5)}{2}$$
$$= \frac{(L_{ext.} - L_{int.}) + (L_{est.+5} - L_{int.+5})}{2}$$

The actual measuring procedure can be carried out by firstly placing the optical path switching prism 17 on the positions "a" and "b" and then detecting at respective positions "a" and "b" the phase difference corresponding to the difference in optical path between the external optical path and internal reference optical path and finally obtaining from the distance measuring means 22 the value of the arithmetical mean of the detected phase difference.

Although the length of optical path in the optical path extension means 20 is selected as $\frac{1}{2}$ the 20 m wavelength of the modulated light for precision measurement in the above-mentioned embodiment, the same effect can be obtained by using a value of the extended length of optical length in the means 20 which is obtained by multiplying $\frac{1}{2}$ the wavelength of the amplitude modulated light for precision measurement by an odd number. This is because the measurement error curve can be represented by a sinusoidal curve having a wavelength equal to $\frac{1}{2}$ the distance measuring wavelength.

The optical distance measuring apparatus of the present invention can provide following excellent effects:

1. It is possible to completely eliminate the measurement error due to the electromagnetic induction noise which would otherwise cause distance measurement error.

2. The error due to drift can be cancelled according to the Thus, the accuracy of the apparatus of the present apparatus is not influenced at all by the drift arising after the completion of adjustment.

3. The compensation for the measurement error can be rapidly and easily carried out in an automatic manner as compared with the conventional method using an electric means.

4. Since the optical fiber used as part of the optical system of the present apparatus is made of a dielectric material (i.e. insulating material) such as quartz or glass, the apparatus is not influenced at all by electromagnetic induction noise which would cause measurement error.

A variety of further modifications and improvements to the present invention, especially to the optical system in the optical path extension means 20 and the second optical path switching means comprising the optical path switching prism 17, are believed to apparent to those skilled in the art. Accordingly, no limitation on the invention is intended by way of the description and drawings herein, except as set forth in the appended claim.

What is claimed is:

1. An optical distance measuring apparatus having a measurement error compensating function, comprising:
   a light emission means for emitting amplitude modulated light toward a target, the distance to which is to be measured;
   a light receiving means for receiving the amplitude modulated light reflected by said target;
   an internal reference optical path for directly leading said amplitude modulated light from said light emission means to said light receiving means;
   an external distance measuring optical path for directing said amplitude modulated light from said emission means toward said target and for leading the amplitude modulated light reflected therefrom to said receiving means;
   an optical path switching means for selecting one or the other of said internal reference optical path and said external distance measuring optical path, and for switching so that said amplitude modulated light from said light emission means can pass along the selected optical path;
   an optical path extension means connected to part of said internal reference optical path and external distance measuring optical path for extending their lengths by a predetermined length;
   a phase detecting means for detecting the phase of an output signal from said light receiving means; and
   a distance measuring means for calculating the distance to said target by using the detected phase from said phase detecting means when said amplitude modulated light passes through both said extended and unextended internal and external optical paths, and for averaging both half-wavelength 2. An optical distance measuring apparatus having a measurement error compensating function, comprising:
   a light emission means for emitting amplitude modulated light toward a target, the distance to which is to be measured;
   a light receiving means for receiving the amplitude modulated light reflected by said target;
   an internal reference optical path for directly leading said amplitude modulated light from said light emission means to said light receiving means;
   an external distance measuring optical path for directing said amplitude modulated light from said emission means toward said target and for leading the amplitude modulated light reflected therefrom to said receiving means;
   an optical path switching means for selecting one or the other of said internal reference optical path and said external distance measuring optical path, and for switching so that said amplitude modulated light from said light emission means can pass along the selected optical path;
   an optical path extension means connected to part of said internal reference optical path and external distance measuring optical path for extending their lengths by a predetermined length;
   a phase detecting means for detecting the phase of an output signal from said light receiving means; and
   a distance measuring means for calculating the distance to said target by using the detected phase from said phase detecting means when said amplitude modulated light passes through both said extended and unextended internal and external optical paths, and for averaging both half-wavelength phase-delayed optical lengths and non-phase-delayed optical lengths;
   wherein said predetermined length of said optical path extension means is equal to the length which is obtained by multiplying $\frac{1}{2}$ the wavelength of the amplitude modulated light for precision measurement by an odd number.

3. An optical distance measuring apparatus having a measurement error compensating function, comprising:
   a light emission means for emitting amplitude modulated light toward a target, the distance to which is to be measured;
   a light receiving means for receiving the amplitude modulated light reflected by said target;
   an internal reference optical path for directly leading said amplitude modulated light from said light emission means to said light receiving means;
   an external distance measuring optical path for directing said amplitude modulated light from said emission means toward said target and for leading the amplitude modulated light reflected therefrom to said receiving means;
   an optical path switching means for selecting one or the other of said internal reference optical path and said external distance measuring optical path, and for switching so that said amplitude modulated light from said light emission means can pass along the selected optical path;
   an optical path extension means connected to part of said internal reference optical path and external distance measuring optical path for extending their lengths by a predetermined length;
   a phase detecting means for detecting the phase of an output signal from said light receiving means; and
   a distance measuring means for calculating the distance to said target by using the detected phase from said phase detecting means when said amplitude modulated light passes through both said extended and unextended internal and external optical paths, and for averaging both half-wavelength phase-delayed optical lengths and non-phase-delayed optical lengths;
   wherein said predetermined length of said optical path extension means is equal to the length which is obtained by multiplying $\frac{1}{2}$ the wavelength of the amplitude modulated light for precision measurement by an odd number, wherein said odd number is equal to 1.

* * * * *